United States Patent [19]

Searle et al.

[11] Patent Number: 5,672,834

[45] Date of Patent: Sep. 30, 1997

[54] TORGUE INDICATING DEVICE

[75] Inventors: Bryan Norman Searle, Shipton-under-Wychwood; David John Fortune, Weston, both of United Kingdom

[73] Assignee: British Autogard Limited, Gloucestershire, United Kingdom

[21] Appl. No.: 378,482

[22] Filed: Jan. 26, 1995

Related U.S. Application Data

[63] Continuation-in-part of Ser. No. 215,330, Mar. 21, 1994, abandoned.

[30] Foreign Application Priority Data

Jan. 29, 1994 [GB] United Kingdom ............ 9401708
Aug. 5, 1994 [GB] United Kingdom ............ 9415883

[51] Int. Cl.$^6$ .................................................. G01L 1/22
[52] U.S. Cl. ........................... 73/862.338; 73/862.325
[58] Field of Search ............... 73/862.321, 862.325, 73/862.326, 862.328, 862.329, 862.331, 862.338, 862.339; 324/207.15–207.18; 336/30

[56] References Cited

U.S. PATENT DOCUMENTS

| | | | |
|---|---|---|---|
| 2,403,952 | 7/1946 | Ruge | 73/862.338 |
| 4,186,596 | 2/1980 | Bohringer et al. | 73/862.338 |
| 4,285,236 | 8/1981 | Chien | 73/151 |
| 4,555,956 | 12/1985 | Reich | 73/862.321 |
| 4,573,362 | 3/1986 | Haggstrom | 73/862.66 |
| 4,605,925 | 8/1986 | Mark | 340/870.29 |
| 4,656,875 | 4/1987 | Uitermarkt | 73/862.45 |
| 4,854,179 | 8/1989 | Amiani | 73/862.04 |
| 5,195,382 | 3/1993 | Peilloud | 73/862.321 |
| 5,195,383 | 3/1993 | Tanaka et al. | 73/862.325 |
| 5,237,880 | 8/1993 | Dobler et al. | 73/862.321 X |
| 5,394,760 | 3/1995 | Persson et al. | 73/862.331 |

FOREIGN PATENT DOCUMENTS

| | | |
|---|---|---|
| 0168998 | 2/1986 | European Pat. Off. . |
| 0 291 344 A2 | 11/1988 | European Pat. Off. . |
| 0310095 | 10/1989 | European Pat. Off. . |
| 2445520 | 7/1980 | France . |
| 42 31 072A1 | 8/1993 | Germany . |
| 2 039 063 | 7/1980 | United Kingdom . |
| 886127 | 1/1992 | United Kingdom . |
| WO 85/02011 | 9/1985 | WIPO . |

*Primary Examiner*—Richard Chilcot
*Assistant Examiner*—Elizabeth L. Dougherty
*Attorney, Agent, or Firm*—Marshall, O'Toole, Gerstein, Murray & Borun

[57] ABSTRACT

A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electromagnetic radiation receiving said signal produced by said torque sensing means, and communicating an output signal dependent on said torque to receiving means which provides an output responsive to said transmitted torque.

19 Claims, 8 Drawing Sheets

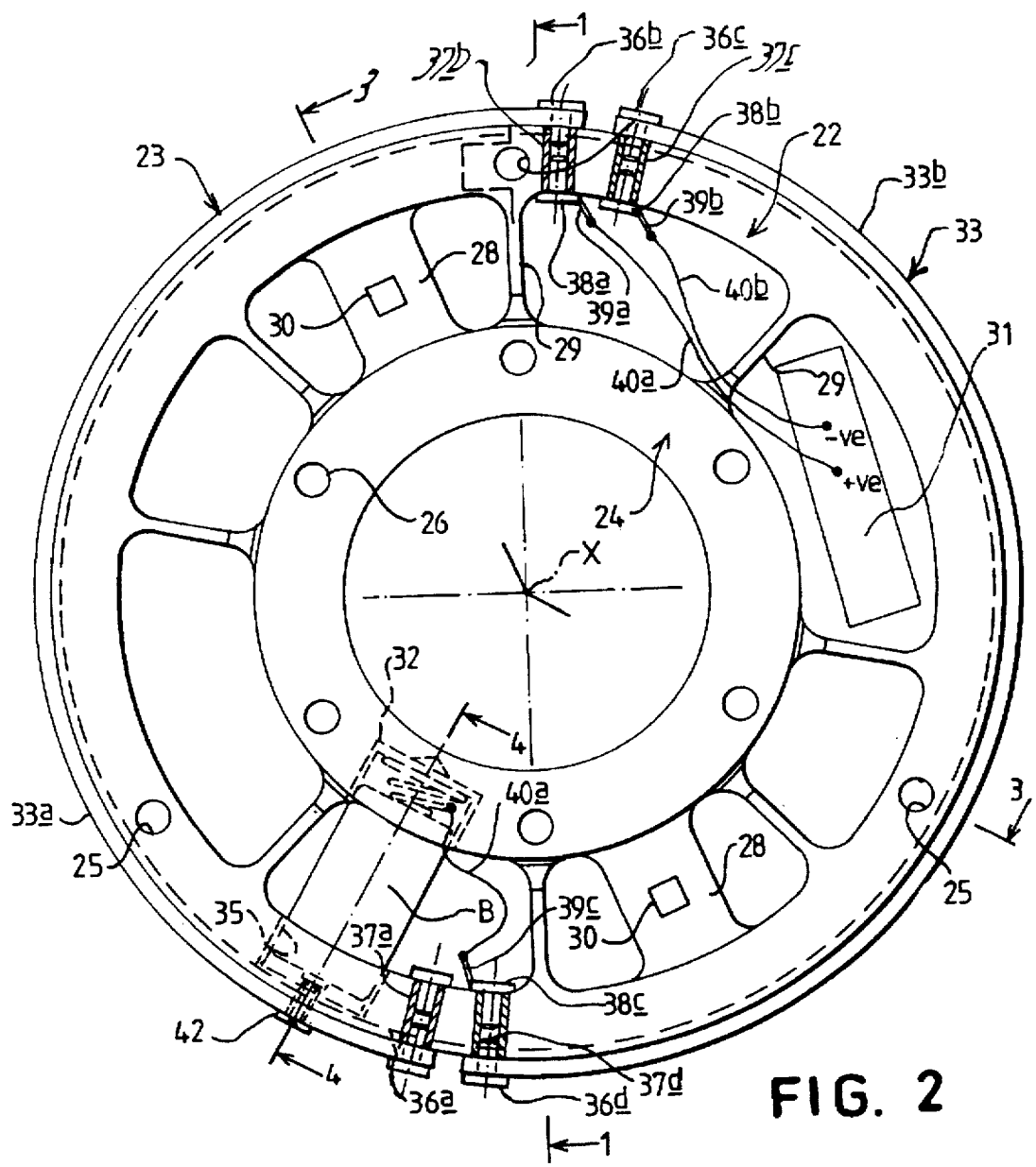
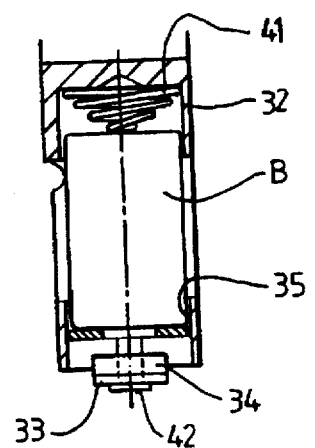
FIG. 2
FIG. 4

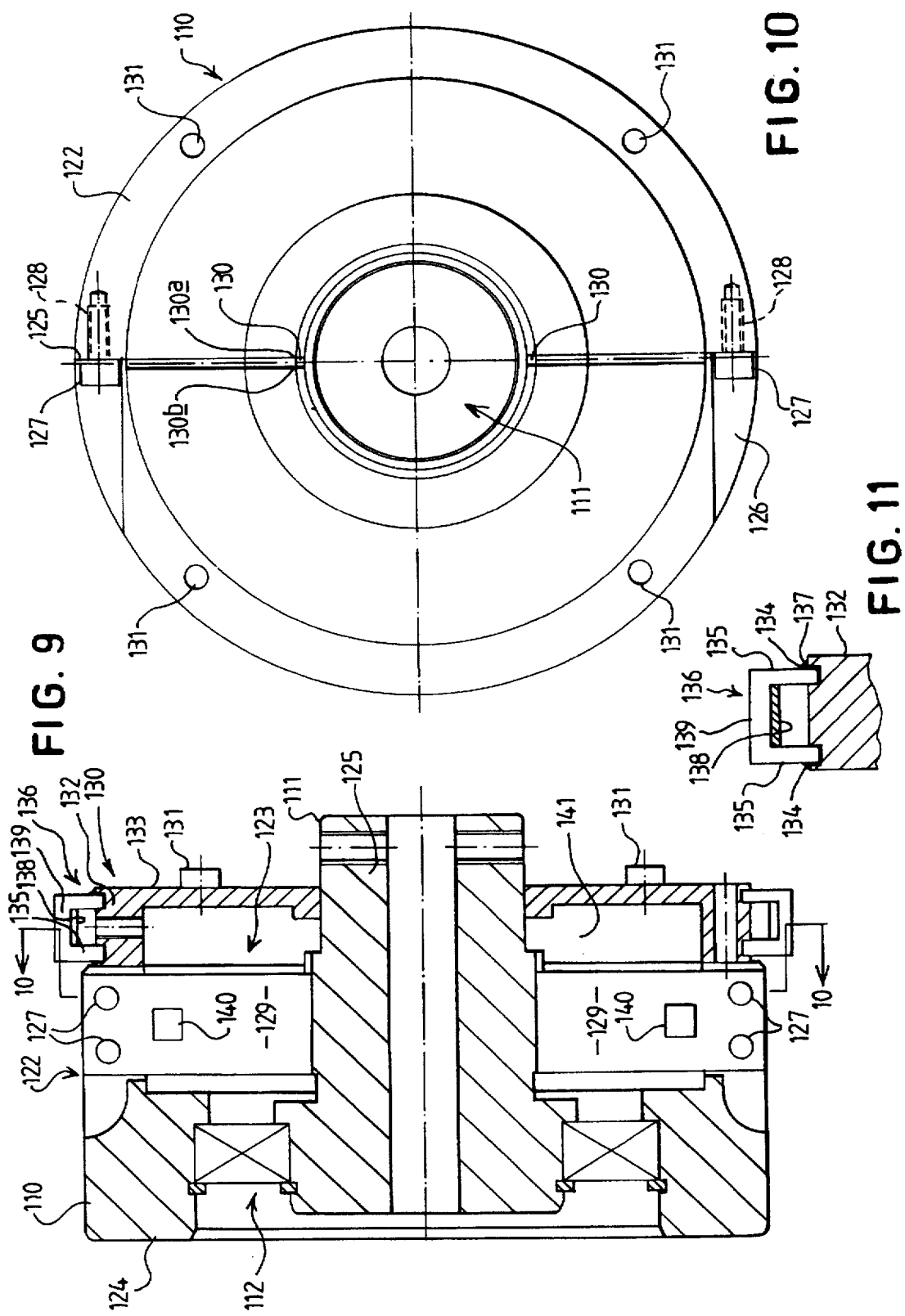

TORQUE INDICATING DEVICE

This application is a continuation in part of Ser. No. 08/215,330 filed Mar. 21, 1994, now abandoned.

BACKGROUND TO THE INVENTION

This invention relates to a torque indicating device.

An object of the invention is to provide a new and improved torque indicating device.

SUMMARY OF THE INVENTION

According to the present invention we provide a torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electromagnetic radiation receiving said signal produced by said torque sensing means, and communicating an output signal dependent on said torque to receiving means which provides an output responsive to said transmitted torque.

The device may be rotatable about an axis and the first part may comprise a radially inner part, relative to said axis, and the second part may comprise a radially outer part, relative to said axis, and the torque transmitting means may comprise at least one radially and circumferentially extending torque transmitting element extending between said parts to transmit torque therebetween.

The outer part may comprise a ring and/or the inner part may comprise a ring.

The inner part may be disposed co-axially within the outer part with said at least one torque transmitting element extending therebetween.

In a first more specific aspect of the invention, the or each torque transmitting element may have a thickness in the axial direction which is less than its width in the circumferential direction.

Alternatively, in a second more specific aspect of the invention, the or each torque transmitting element may have a thickness in the circumferential direction of the device which is less than its width in the axial direction thereof.

The inner part and outer part may be further interconnected by a plurality of radially and axially extending webs which provide axial stability to the torque indicating device.

Said radially and axially extending webs may be relatively thin in the circumferential direction of the device and relatively wide in the axial direction thereof.

In each of the first and second more specific aspects the inner and outer parts may be solely interconnected by said torque transmitting element and said webs where present.

Further alternatively, in a third more specific aspect of the invention, the inner part may comprise a hub on which the outer part is rotatably mounted with the inner part having an axially extending portion disposed radially within an axially extending portion of the outer part and at least one torque transmitting element extending between said portions.

In this case the or each torque transmitting element may have a width in the axial direction which is greater than its thickness in the circumferential direction.

In this case the torque transmitting element or elements may act to provide axial stability.

The torque transmitting element or elements may be connected to the inner and outer parts in either a "encastré" or "simply supported" or a combination of these modes.

The device may be provided with two diametrically opposite torque transmitting elements.

The inner part and the outer part may be adapted to be connected to first and second rotatable components so as to transmit torque therebetween.

The communicating means may be powered by a battery means carried on the device.

The torque indicating device may be provided with a control means whereby a measurement of torque and/or communication of said output signal is performed intermittently.

The frequency of measurement of the torque and/or communication of said output signal may be dependent upon the magnitude of the torque. Consequently the power consumption required to sample the torque and/or communicate the output signal is reduced compared with the power consumption which would be necessary if the torque were sampled continuously and/or the output signal were communicated continuously.

When the torque is below a predetermined level the frequency of measurement and/or communication may be at a first rate, whilst when the torque is at or above said predetermined level the frequency of measurement and/or communication may be at a greater rate. For example, the lower rate of measurement and/or communication may be in the range 50 to 1000 milliseconds whilst the higher rate may be in the range 1 to 50 milliseconds.

Typically, 5 hertz when the torque is less than 5% of the full scale deflection and 100 hertz when the torque equals or is greater than 5% full scale deflection.

The torque sensing means may comprise strain gauge means.

The strain gauge means may comprise a strain gauge bridge. The output of the bridge may be supplied to an amplifier.

The amplifier may provide an output signal which may be fed to a single to bi-polar converter so as to give a signal dependent upon the direction of the torque being transmitted.

The output of the single to bi-polar converter may be fed to a micro-processor.

The micro-processor may be an 8 bit micro-processor and may comprise an analogue to digital converter.

The desired waveband may be visible, infra-red, or, preferably, radio frequency transmitted from an aerial.

The radio frequency transmitter may transmit an amplitude modulation or frequency modulation type signal.

The transmitter may comprise a low power radio frequency oscillator which transmits an output signal to a receiving means.

The aerial may be adapted to radiate the output signal uniformly or substantially uniformly circumferentially around the device.

The aerial may comprise a conductor which extends at least partially circumferentially around the device.

Preferably the device has a circular radially outwardly or inwardly facing circumferential surface on which the aerial is mounted.

The aerial may be insulated from the device by a suitable insulating means.

The aerial may be connected in the battery circuit and may be used to feed electric current from the battery to the torque sensing means and the communicating means.

The aerial may comprise two aerial parts, one of said parts may provide a conductor for negative current supply from the battery and the other of said parts providing a contact for positive current supply from the battery.

When the device comprises inner and outer parts of the ring configuration as described hereinbefore this facilitates mounting the communicating means (and the control means when provided) and a battery on the torque indicating device.

The device may be provided with a radially extending opening through which a battery means may be mounted on the device.

Preferably, said opening is provided in said outer part and the inner part is provided with a radially extending socket, radially aligned with said opening, in which a portion of the battery means is received and a second portion of the battery means being received in the opening in the outer part, retaining means being provided to retain the battery means to the torque indicating device.

The aerial may comprise said retaining means for the battery means.

The battery may be radially replaceable.

Where the device comprises said hub on which a radially extending part of the outer part is rotatably mounted, the device may be provided with an end cap mounted on said outer part to rotate therewith, with the or each torque transmitting element disposed between the radially extending part and the end cap.

In this case the battery and/or the communicating means and/or the control means may be housed within the end cap.

The arrangement of the aerial and other items facilitates sealing so that the device is easily adapted for use in industries such as a food industry where there is risk of contamination of product or damage to the device from process fluids or particles. In addition the device is sufficiently robust to be able to withstand all weather conditions and other environments in which it may be used.

Because of the hereinbefore described low measurement and/or communicating rate at low torque the device may have a relatively long "inactive" life without significant shortening of battery life. For example, the device may be stored prior to installation with the communicating means and the control means operative but because of the low current consumption due to the low sampling rate, the battery life is not significantly reduced.

The control device may be adapted to sense battery voltage and the communicating means may be adapted to communicate a signal dependent on the battery voltage so that the need to replace the battery may be monitored by the receiving means.

When the torque sensing means is initially switched on, the reading obtained may be unstable and accordingly the control means initially switches on the torque sensing means and then switches on the communicating means.

The device may be provided with at least one target for sensing by, for example, a photo-electric cell to indicate the speed of rotation of the device.

The speed of rotation of the device may be multiplied by the torque to provide an indication of power.

Instead of a radio frequency transmitting means, other communicating means may be provided, for example, a display dependent upon torque provided on the device. For example, a liquid crystal display and the receiving means may read the liquid crystal display with a suitable scanning device and then provide a desired output dependent upon torque. The liquid crystal display may, for example, display an output signal in the form of a suitable bar code.

The transmitting means may comprise a relatively low power radio frequency oscillator without any power amplification stage as it is not necessary for the signal to be propagated, other than a very short distance to the receiving means, which is physically located closely adjacent to the torque indicating device.

BRIEF DESCRIPTION OF THE DRAWINGS

Examples of the invention will now be described by way of example with reference to the accompanying drawings wherein:

FIG. 2 is a view of the torque communicating device of FIG. 1 in the direction of the arrow A in FIG. 1;

FIG. 4 is a section on the line 4—4 of FIG. 2;

FIG. 7 is a flow chart which illustrates the cycle of the torque communicating device of FIGS. 1 to 6a;

FIG. 9 is a transverse cross-section through another torque transmitting assembly incorporating a torque indicating device embodying the invention;

FIG. 10 is a section on the line 10—10 of FIG. 9, and

FIG. 11 is a fragmentary view, to an enlarged scale, of part of FIG. 9.

DESCRIPTION OF THE PREFERRED EMBODIMENTS

Figure 1:
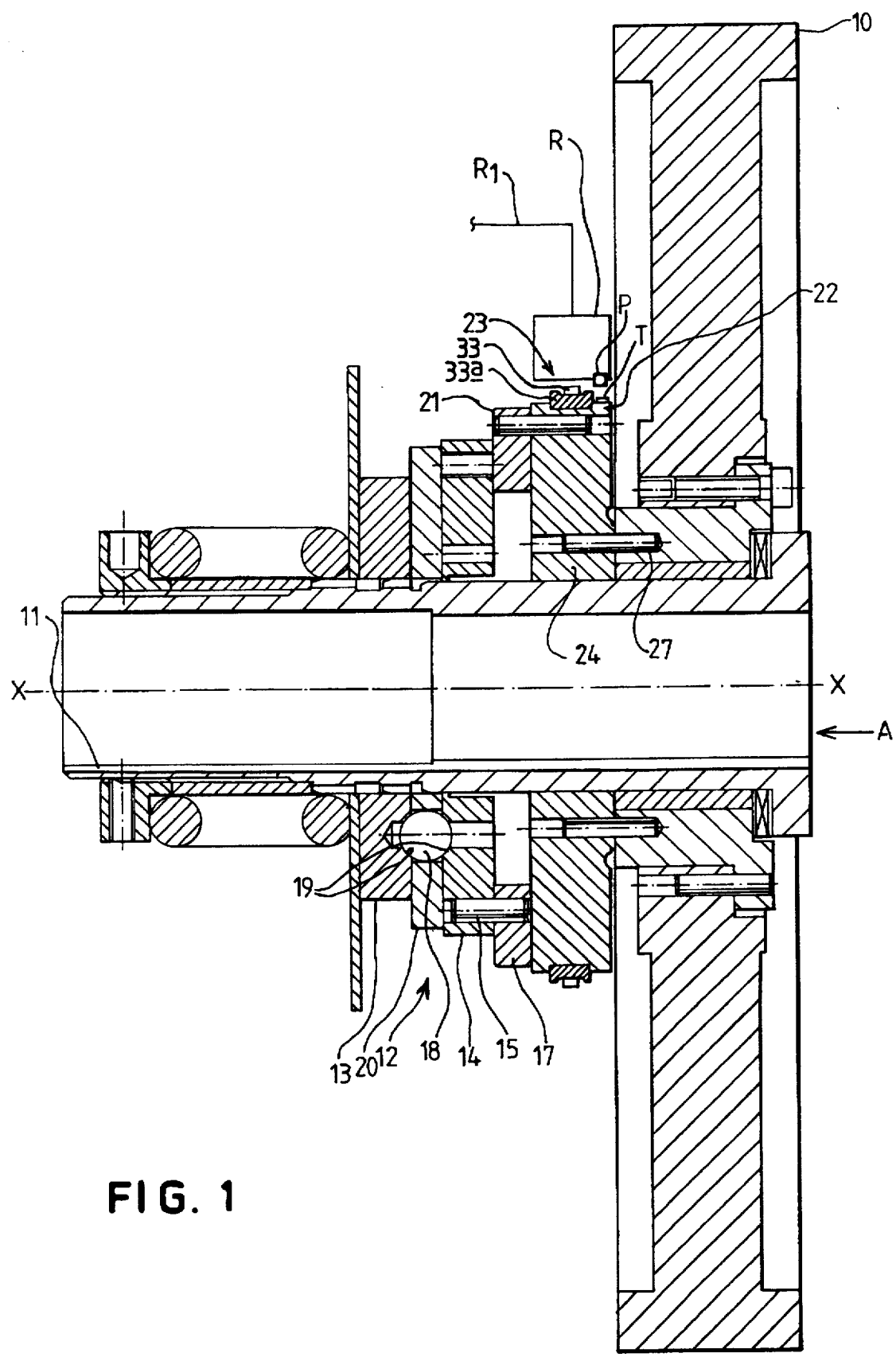
FIG. 1 is a transverse cross-section through a torque transmitting assembly incorporating a torque indicating device embodying the invention with the section through the torque indicating device being shown on the line 1—1 of FIG. 2.

Referring now to FIG. 1, a torque transmitting assembly comprises an output member 10 is driven by an input member 11 through a torque limiting clutch 12. The torque limiting clutch 12 has a first clutch plate 13 slidably and non-rotatably keyed to the input member 11 and a second clutch plate 14 which is rotatable relative to the input member 11 and is connected by split pins 15 to a coupling ring 17. The clutch plates 13 and 14 are disengageably connected together by torque transmitting balls 18 releasably engageable in recesses 19 of the clutch plates 13, 14 and are guided by a cage plate 20.

The coupling ring 17 is connected by three further split pins 21 to an outer part 22 of a torque indicating device 23.

Figure 3:
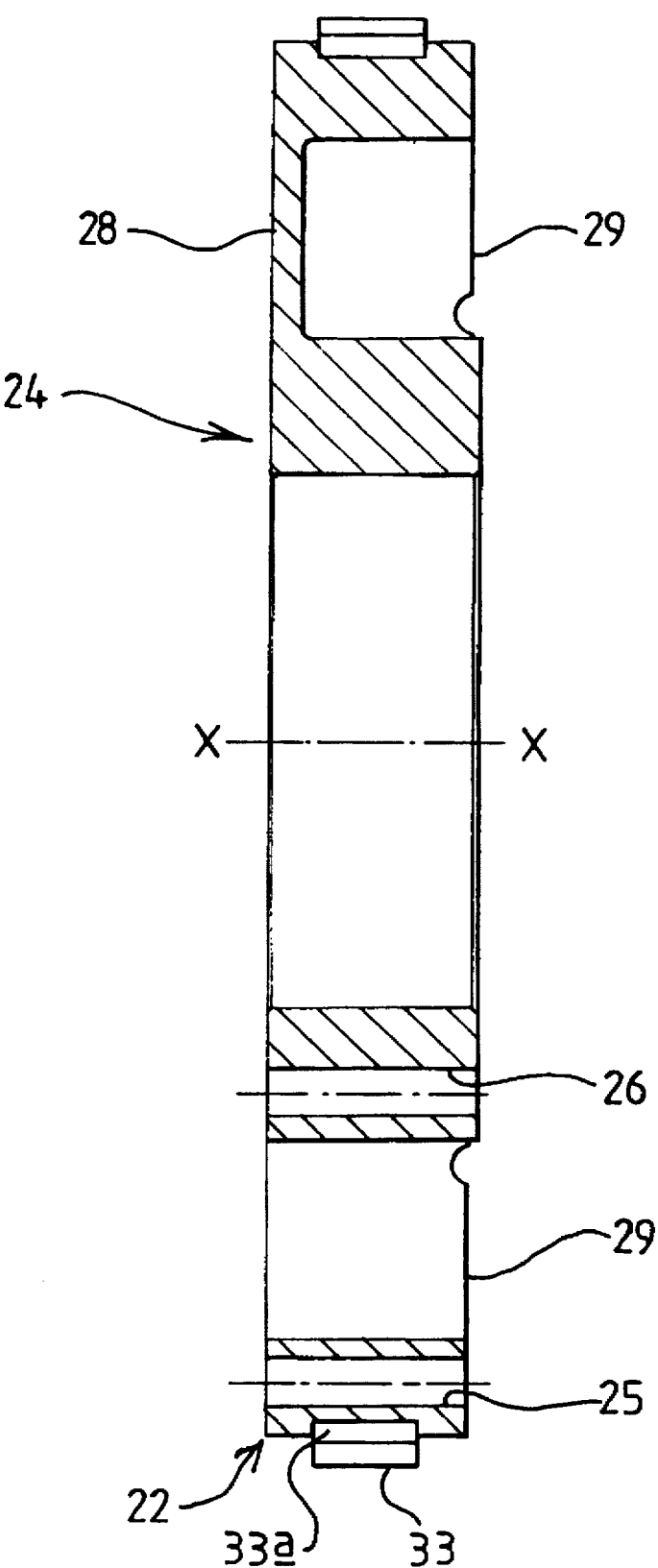
FIG. 3 is a section on the line 3—3 of FIG. 2.

As best shown in FIGS. 2–4 the torque indicating device 23 comprises the outer part 22 which is ring shaped and an inner part 24 which is also ring shaped. The outer part 22 has three axially extending apertures 25 within which the three dowel pins 21 are received to connect the outer part 22 to the connecting ring 17. The inner part 24 is provided with six apertures 26 in which are received six dowel pins 26a to connect the inner part 24 to the outer member 10.

The outer part 22 and the inner part 24 are interconnected by a pair of diametrically opposed torque transmitting elements 28 which, as best shown in FIG. 3, are relatively thin in the axial direction of the device, i.e. in a direction parallel to a central axis X—X of the device and are relatively wide in a circumferential direction, as shown in FIG. 2.

The inner and outer parts are also connected together by eight radially and longitudinally extending webs 29 which are relatively thin in the circumferential direction, as shown in FIG. 2, but are relatively wide in the axial direction, as shown in FIG. 3, and thus the webs 29 provide axial stability for the connection between the inner and outer parts 24, 22.

The torque transmitting elements 28 and the webs 29 are connected to the outer and inner parts 22, 24 by virtue of being integral therewith and so are connected thereto in an "encastré" structural mode.

A strain gauge means 30 comprising a conventional strain gauge bridge is applied to each of the torque transmitting elements 28 with the strain gauges being configured so that their resistance varies in accordance with strain of the elements 28 as a result of the torque being transmitted.

The output of the strain gauge means 30 is connected to a microprocessor system 31 which is connected to a transmitting aerial 33 which extends circumferentially around the outer circumference of the outer part 22 and is insulated therefrom by an insulating ring 34.

The aerial 33 comprises two generally semi-circular parts 33a, 33b which are connected to a negative terminal and a positive terminal respectively of a battery B and provide a current path into the microprocessor system 31.

The battery B is housed in a blind recess 32, of circular cross-section and extending radially relative to the axis A—A provided in the inner part 24 and in a corresponding radially extending cylindrical aperture 35 provided in the outer part 22. The battery is retained in position by the insulating ring 34 and aerial part 33a which are held in place by screws 36, 36a–b which are received in threaded inserts 37a–b which are insulated from the outer part 22.

The threaded insert 37b receives a further screw 38a which anchors a terminal tag 39a in electrically conducting relationship with the insert 37b and hence with the aerial part 33a and the tag 39a is connected by a wire 40a to a positive terminal of the microprocessor system 31. Similarly, the insert 37b receives a further screw 38b which anchors a tag 39b connected by a wire 40b to a negative terminal of the microprocessor system.

A frusto-conical spring 41 is received in the recess 32 and engages the negative terminal of the battery B. The spring 41 is connected by a further wire 40c to a terminal tag 39c which is anchored by a further screw 38c to the insert 37b.

The aerial part 33a has a further screw 42 threadedly engaged therewith, the inner end of which engages the positive terminal of the battery B. The aerial parts 33a and 33b thus provide a current path from the positive and negative terminals respectively of the battery B to the positive and negative terminals of the microprocessor system 31.

This mounting of the battery B renders battery replacement relatively simple since the battery can be easily accessed in the assembly shown in FIG. 1 simply by removing the screw 36a and displacing the insulating ring 34 and aerial part 33a to permit removal of the old battery followed by refixing of the aerial. Because the access is radial the replacement can take place without any need to disconnect the torque indicating device from the assembly.

Figure 5:
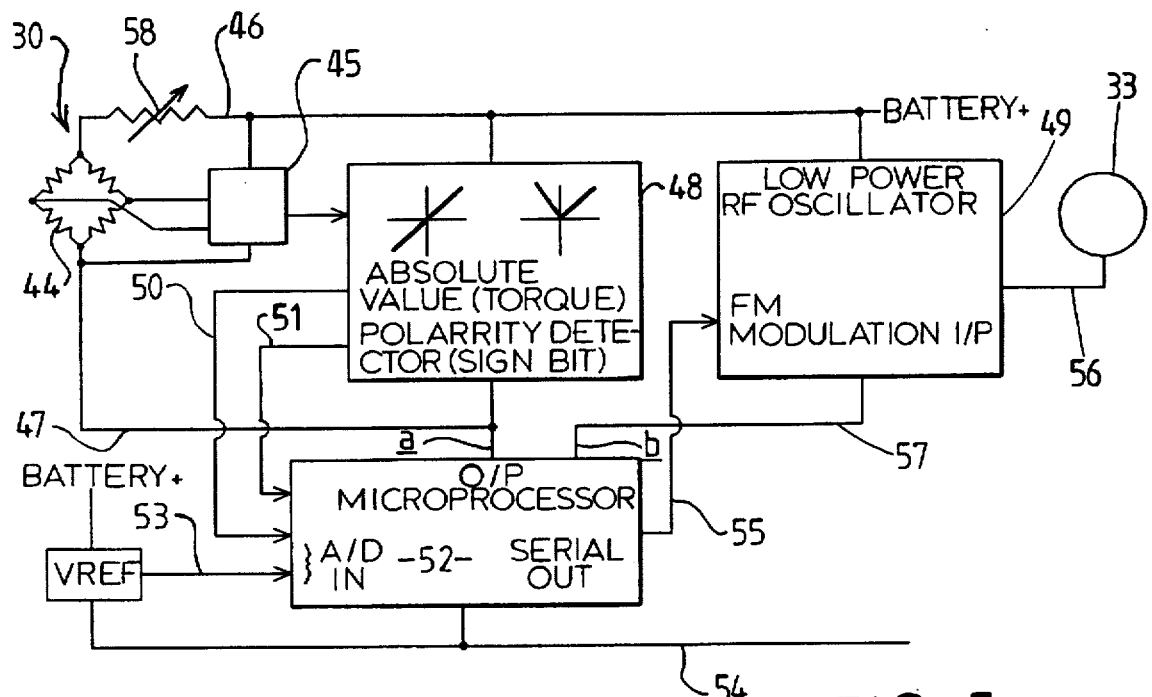
FIG. 5 is a block circuit diagram of the torque communicating device of FIGS. 1 to 4.

Referring now to FIG. 5, there is illustrated diagrammatically the electric circuit of the torque transmitting device.

The strain gauge means 30 comprises a conventional strain gauge bridge arrangement 44, the output of which is fed to an amplifier 45 and power is supplied on lines 46 and 47. The line 46 is connected to the positive battery terminal and provides positive supply to the amplifier 45, a single to bi-polar converter 48 and a low power radio frequency oscillator 49 which provides a transmitter which acts as a communicating means to communicate an output signal dependant upon the torque sensed by the stain gauge means. If desired a transmitter of electromagnetic radiation of other than radio frequency may be provided in association with a suitable receiver, such as a transmitter of electromagnetic radiation in the visible light band. For example, by virtue of liquid crystal display of digits, or a suitable bar code or the like.

The output from the amplifier 45 is fed to the single to bi-polar converter 48 the output of which is fed on lines 50 and 51 to an eight bit microprocessor 52, the line 51 carrying a polarity detection or sign bit. The microprocessor 52 is connected to a negative terminal of the battery on line 54 and is also supplied with a voltage reference signal on the line 53.

The microprocessor provides a serial output on line 55 to the oscillator 49 and the oscillator 49 provides a signal on line 56 which is supplied to the aerial 33, for example on lines 40a, 40b and transmitted therefrom as a radio frequency signal. The microprocessor 52 is also connected on line 57 to the oscillator 49.

The microprocessor system comprises a central processor unit (CPU) connected to an address bus, a data bus and a control bus. The address bus is connected to a random access memory (RAM) serving as a working store, a programmable read-only memory (PROM) serving as a store for the operating programme of the system and input and output buses to which the lines 50, 51, 53 and 54 are connected. In addition, the microprocessor provides a switched output to line 47 or line 57.

Figure 6:
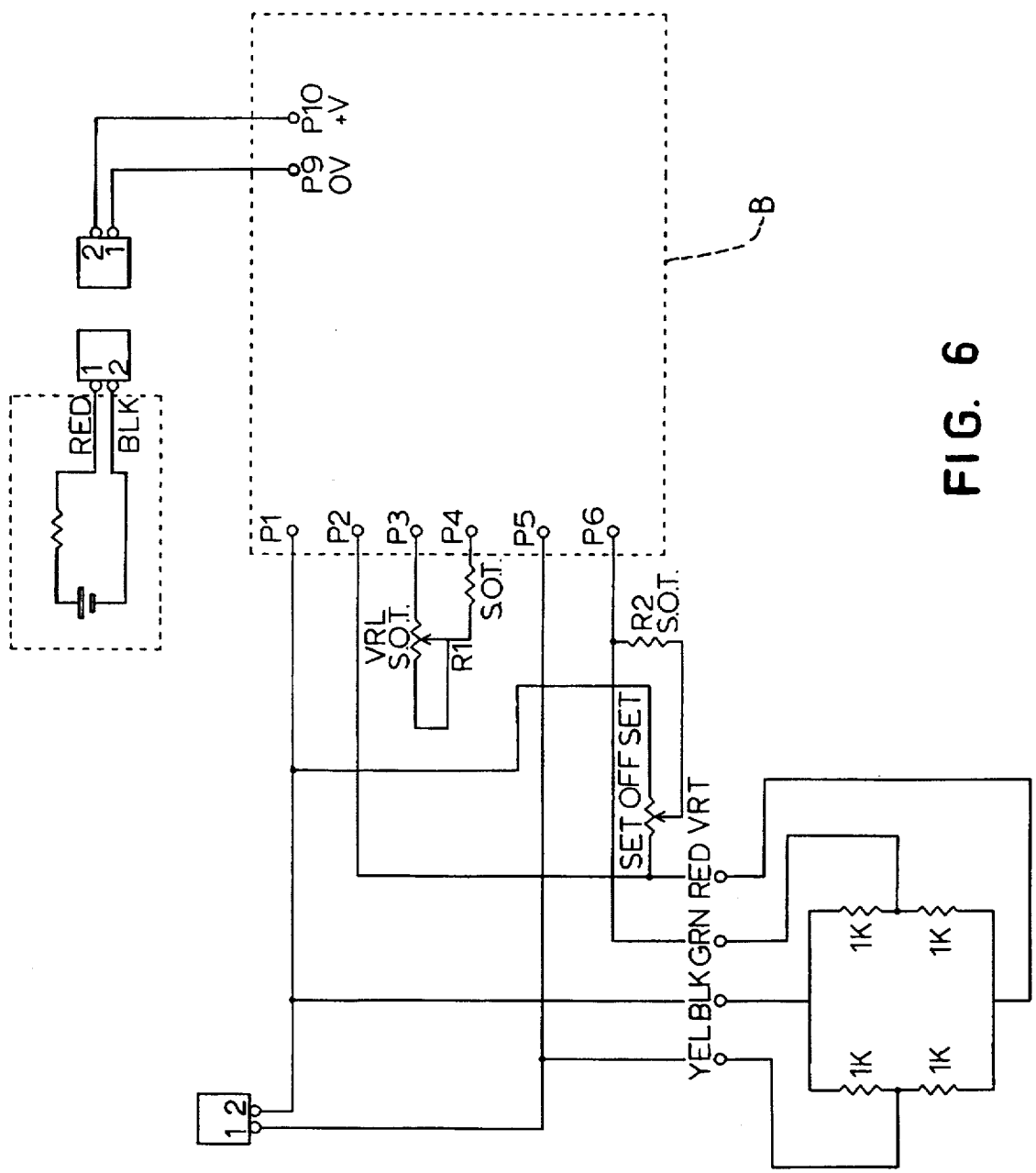
FIG. 6 is a circuit diagram in respect of the torque communicating device of FIGS. 1 to 4.
Figure 6A:
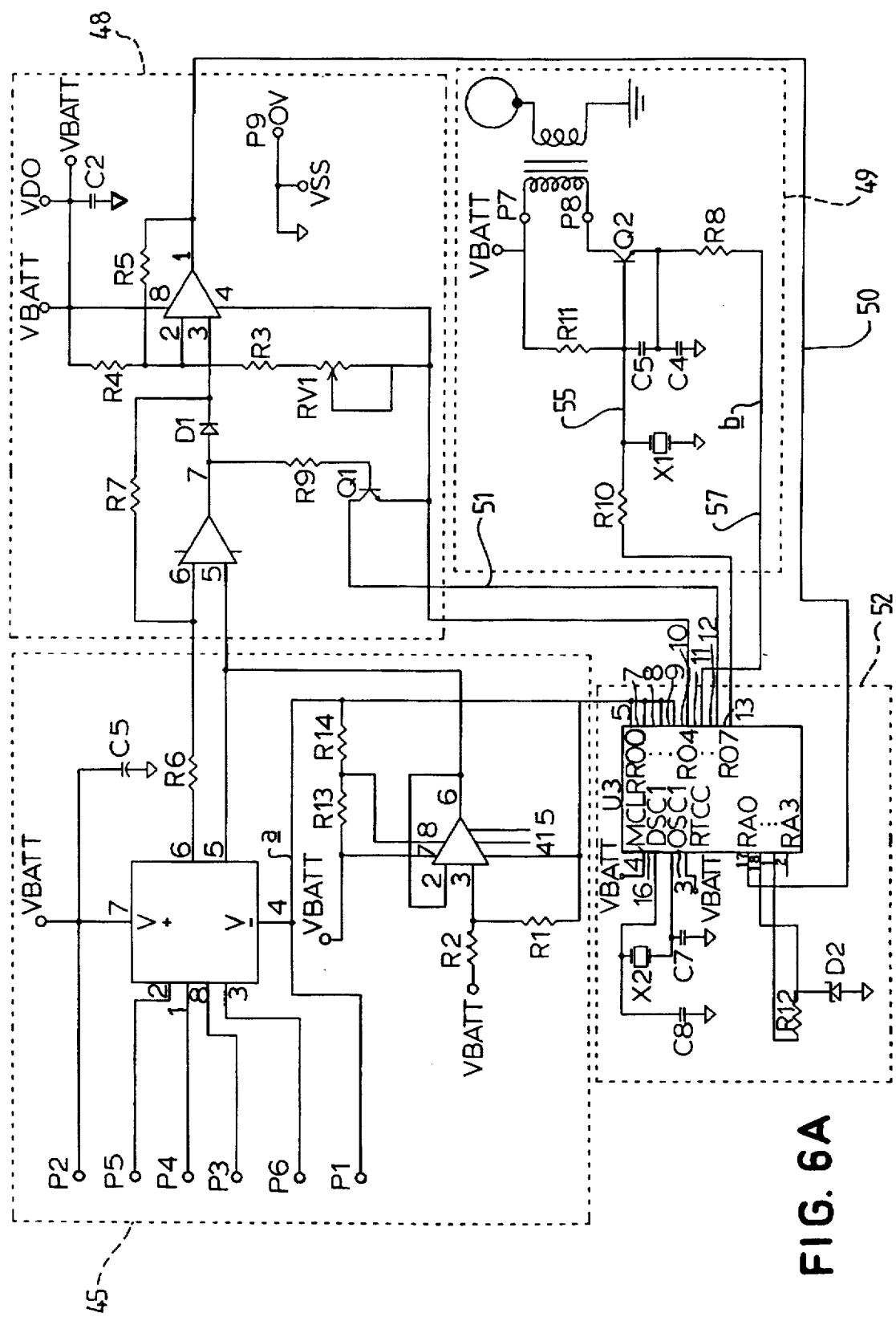
FIG. 6a is a circuit diagram showing part B of FIG. 6 in more detail.

Referring now to FIGS. 6 and 6a, FIG. 6a is a circuit diagram in respect of the amplifier 45, the single to bi-polar converter 48, the oscillator 49 and the microprocessor 52. The strain gauge bridge 44 is connected as shown in FIG. 6a to the terminal $P_1$, $P_2$, $P_5$, $P_6$, of the differential amplifier provided by the components within the block identified in dashed line in FIG. 6a at 45, whilst a gain setting resistor, in the form of a potentiometer, is connected to terminals $P_3$ and $P_4$. The differential amplifier 45 includes a reference voltage circuit comprising integrated circuit U4 and which also supplies the single to bi-polar converter which is provided by the components within the dashed line 48 of FIG. 6a.

The converter 48 performs an absolute value and sign detection on the output from the amplifier 45 and also conditions a signal so that it covers the full input range of the analogue to digital converter of the microprocessor provided by the components in the dashed line box 62 of FIG. 6a. The microprocessor 52 performs the analogue to digital conversion and produces a serial bit stream on line 55 to modulate the RF oscillator provided by the components in the dashed line box 49 of FIG. 6a. The absolute value signal is supplied from the converter 48 on line 50 whilst the polarity detector is supplied on line 51 in FIG. 6a.

FIG. 6 also illustrates how a battery assembly B is connected in circuit.

The RF oscillator 49 comprises a single transistor stage using a crystal element operating in fundamental mode. Since the whole circuit must be operated at very low power levels so as to give a long battery life, for example six months, and since there is no requirement for range, no power amplification stage is necessary or desirable. Only sufficient radio frequency power is developed in order to fully drive a receiver at a distance of, for example, 25 mm or less away from the aerial.

The aerial 33 is directly loosely coupled into the oscillator circuit output by a transformer coupling comprising four turns of wire 33a around an inductor, the other end being connected to the metalwork of the sensor assembly which is grounded or forms a counterpoise through the bulk of the apparatus with which the device is used. This increases the radiated radio frequency power considerably. Narrow band frequency modulation is achieved by changing the DC bias point and hence the parasitic capacitances in the base/emitter and collector/base circuits. The frequency change is approximately ±100 hertz from a nominal means centre frequency, which is itself correctly adjusted with a small variable capacitor across the crystal.

The receiver R is of any suitable kind, for example, a simple "data sheet", single conversion superhet design using, for example, an MC3361 chip. A fundamental crystal is used to give 455 kilohertz IF. The output from the FM modulator is AC coupled with a comparator which drives the output at TTL levels. The squelch circuit operates at high HF noise to clamp the input to the comparator and the desired information can be presented as described hereinafter.

Figure 7:
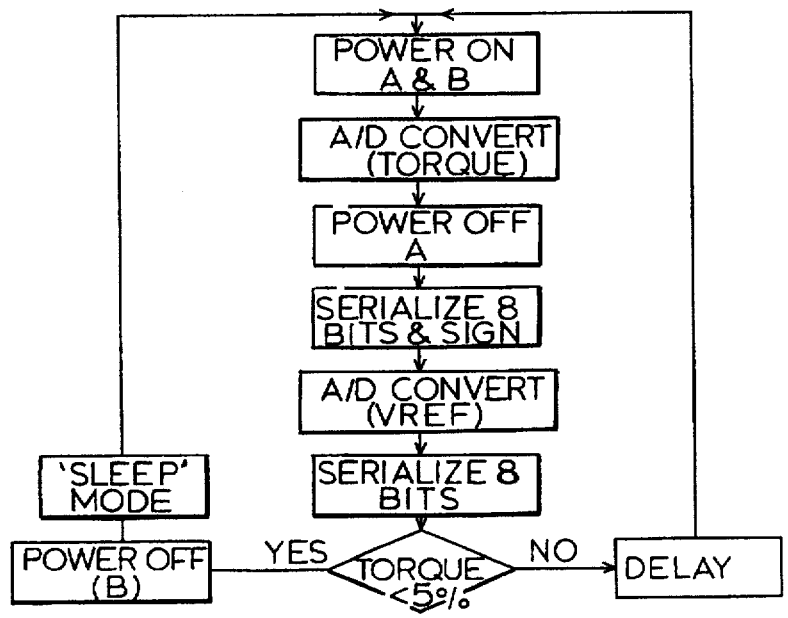

The microprocessor controls the operation according to the programme in PROM. Referring to the flow chart of FIG. 7, the operation is as follows:

The clock of the microprocessor initially switches power on to lines a and b. The microprocessor then receives signals of the absolute value of the torque on line 50 in analogue form from the single to bi-polar converter 48 and the power on line 47 is then switched off.

The microprocessor performs an analogue to digital conversion and eight bit serialises the torque value and ascribes a sign in accordance with the polarity detector signal supplied on line 51. The microprocessor then digitises the input from the voltage reference and eight bit serialises this information. The microprocessor compares the torque value with full scale output of the A/D stage and if the torque is less than 5% of this the microprocessor switches the power off on line b and the system remains in this condition until the microprocessor clock reaches the end of a pre-programmed sleep mode which lies in the range 50 to 1000 milliseconds, in the present example 5 hertz. Thereafter the microprocessor switches power on at lines 47 and 57 and the cycle is repeated as previously described. The bridge is provided with a scaling resistor 58 which can be adjusted to give a full scale output of the A/D converter stage for a predetermined torque.

Alternatively, if the torque comparison indicates that the torque is not less than 5%, the power on line 57 is maintained and after a short delay, which typically lies in the range 150 milliseconds, and in the present example is 100 hertz, the cycle is repeated by the switching of power on to both lines 47 and 57.

The circuit is powered, in the present example, by the battery B which comprises a lithium thionyl chloride battery of 1500 mAh capacity. The battery provides a d.c. current at a voltage lying in the range 3.3–3.7 volts. This voltage is determined by the reciprocal of the digitised VREF, since all A/D conversions are ratiometric.

When the torque is less than a predetermined value then, as explained above, the circuit is arranged to sample the torque at a relatively low frequency. In the present example 5 hertz. However, when, as a result of such a sampling, the torque is detected to be greater than the predetermined value a higher sample and transmission rate is signalled to occur, in the present example 100 hertz. As a result, because the circuit is not sampling and transmitting a signal continuously, the power consumption of the device is relatively small compared with consumption which would be the case if the sampling were performed continuously.

In the present example the signal is a frequency modulated signal at a nominal frequency of 27.145 MHz.

The radiated signal is detected by a receiver R located adjacent the aerial 33, in the present example 5 mm apart but which may lie preferably in the range 2 mm to 10 mm, for example, up to 25 mm apart. The receiver R is supplied with power on line $R_1$ and is arranged to display the detected torque and, if desired, power and/or battery state, in any desired manner. If desired the receiver may provide a signal to a printer to provide a permanent record and/or to a computer system. To enable display of power, a reflective target T is provided at one position, or at a plurality of circumferentially spaced positions on the outer parts 22, or on any other convenient rotating component of the device. Passage of the target T past a photo electric cell P is detected and the time taken for a complete revolution is thus measured to provide the speed of rotation of the device. The torque transmitted is multiplied by the thus determined speed to enable power transmitted by the device to be displayed.

The present invention provides the ability to change the sensitivity of the device by appropriate selection of materials from which the torque transmitting means is made. In the present example, the torque transmitting means is made of steel which has an outside diameter of 150 mm for the outer part 22 and with the webs having a thickness of 2.0 mm and a width of 10 mm provides a torque transmitting capacity of 400 NM.

However, a torque transmitting means of the same dimensions but made of, for example, aluminium, or an aluminium alloy, provides a lower torque transmitting capacity.

Alternatively or in addition, the sensitivity of the torque transmitting means may be adapted by altering the configuration of the torque transmitting means.

Figure 8:
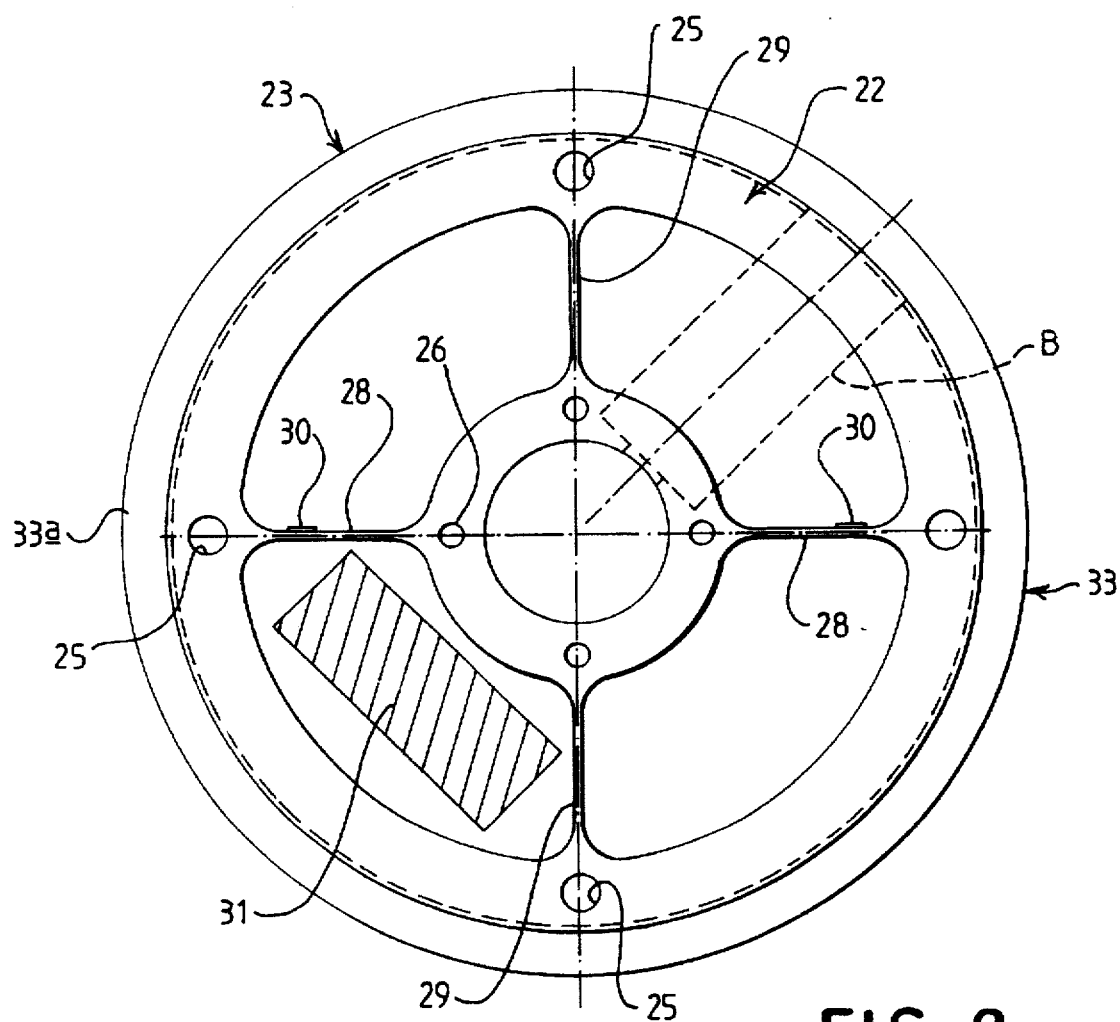
FIG. 8 is a view similar to that of FIG. 2 but of a second embodiment of the invention.

Referring now to FIG. 8 there is illustrated a modification of the embodiment described with reference to FIGS. 1 to 7 in which the same reference numerals are used to refer to corresponding parts as were used in FIGS. 1 to 7.

The device of FIG. 8 is essentially the same as that of the previously described embodiment except for the details of the torque indicating device 23.

In this case the main differences are that two torque transmitting elements 28 are provided which are relatively wide in the axial direction and relatively thin in the circumferential direction of the device and hence are of a configuration similar to webs 29 of the previously described embodiment. In addition, two webs 29 are provided which are disposed orthogonally with respect to the elements 28. Each torque transmitting element 28 can be regarded as fulfilling the function of both a torque transmitting element and a web whereas in the previously described embodiment these functions were separated.

The elements 28 are again integral with the outer and inner parts 22, 24 and so are connected thereto in an "encastré" structural mode.

In addition, the number of connecting apertures 25, 26 is, in the present embodiment, four in each case. Other features of the torque indicating device 23 are essentially as described in connection with the first embodiment and are illustrated only diagrammatically in FIG. 8. The mode of operation of the present embodiment is as described in connection with the first embodiment but the configuration described renders the device suitable for relatively low torques. For example, where the parts 28, 29 are 1 mm thick and 10 mm long in the axial direction, they are suitable for a rated torque of 1 Nm.

It is to be noted that in this embodiment the strain gauges 30 are disposed at a position approximately one quarter of the length along the radial extent of the torque transmitting element.

Referring now to FIGS. 9 to 11 there is illustrated another embodiment of the invention in which a torque transmitting assembly comprises an output member 110 rotatably mounted on a hub shaped input member 111 by means of a bearing means 112. Torque is transmitted between the members 110, 111 by a torque transmitting and indicating device 123.

The torque transmitting and indicating device 123 comprises an outer part 122 of generally cylindrical configuration projecting axially of a radially extending portion 124 which provides a seat for the bearing means 112 and is rotatably mounted on the hub part 111. The hub part 111 also has an axially extending portion 125 which is disposed co-axially with and within the cylindrical axially extending part 122.

The cylindrical part 122 is provided with two radially extending slots 125 which are provided with chordally extending cut-outs 126 to permit access to the heads 127 of clamping bolts 128. The clamping bolts 128 clamp one end of generally rectangular blade shaped torque transmitting elements 129 within the slots 125 and the opposite ends of the blade shaped elements 129 are received in slots 130 provided in the axially extending portion 125 of the inner member 111.

A small clearance is provided between the inner end of the blade shape elements 129 and the walls of the associated slot 130 so that the inner ends of the torque transmitting elements 129 are "simply supported" i.e. so that they can pivot about the outer edge 130a, 130b of the respective side wall of the slot according to the direction of relative rotational displacement between the inner and outer members 111, 110. Alternatively, the slots may be of such dimensions that the inner ends of the torque transmitting elements 129 are a tight fit therein so that the inner ends are mounted in "encastré" mode. Further alternatively, the slots may have such clearance with the elements 129 that on initial angular displacement of the members 111, 110 a "simply supported" mode applies, whilst on further displacement an "encastré" mode applies. Similar options may be provided for the other ends of the elements 129 by suitably connecting the outer ends to the outer member. Furthermore, the torque transmitting elements of the other embodiments described hereinbefore may be provided with a similar range of options for their mounting mode by providing the torque transmitting elements separate from the associated inner or outer member at least one end thereof and by providing suitable mounting means analogous to those described hereinbefore in connection with the embodiments shown in FIGS. 9 to 11.

An end closure member 130 is clamped by bolts 131 to the cylindrical part 122 of the outer member 110 and comprises a generally cylindrical wall part 132 and a radially extending plate-like part 133. As best shown in FIG. 10, the cylindrical part 132 is provided with a pair of circumferentially extending grooves 134 in which are received the free ends of limbs 135 of a channel section insulating aerial mounting ring 136.

The limbs 135 are retained in the grooves 134 by adhesive 137. An aerial 138 is adhesively secured to the web 139 of the aerial mounting ring 136.

The torque transmitting elements 129 have a strain gauge means 140 mounted thereon, as best shown in FIG. 9.

A battery, communication and control means, as described in connection with the first embodiment, are mounted on the end closure member 130 within the space 141 thereof. Suitable connections are provided between the strain gauges 140 and the communicating and control means and battery as described hereinbefore. The mode of operation of the device described with reference to FIGS. 9–11 is as shown in connection with the first embodiment. The configuration of the torque transmitting elements 129 renders the device more sensitive to low torques.

If desired the torque transmitting element 129 may be of different length, width and thickness to those described hereinbefore and also of different number according to the torque desired to be transmitted and sensed.

If desired, the embodiment described with reference to FIGS. 1–7 may be modified by providing an aerial mounting means similar to that shown at 136 in FIG. 10 and mounting the aerial on the inside thereof as shown in FIG. 11. In addition, in both embodiments separate conductors may be provided for the battery connection and the device of FIG. 1 may also be provided with an enclosure cap analogous to that of the embodiment of FIGS. 8–11 and the battery and electronics may be mounted therein. Furthermore, a solder connection may be provided in the aerial and the transmitting means.

Any feature or features of one embodiment, or embodiments, may be provided in any provided in any other embodiment, where appropriate, and modified as necessary if required.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electromagnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial, and said transmitter includes a radio frequency oscillator which transmits an output signal to a receiving means;

said device is rotatable about an axis and the first part comprises a radially inner part, relative to said axis, and the second part comprises a radially outer part, relative to said axis, and the torque transmitting means comprises at least one radially and circumferentially extending torque transmitting element extending between said parts to transmit torque therebetween; and said inner part and outer part are further interconnected by a plurality of radially and axially extending webs which provide axial stability to the torque indicating device and which have a thickness in the circumferential direction of the device which is less than their width in the axial direction thereof.

2. A device according to claim 1 wherein the outer part comprises a ring and the inner part comprises a ring.

3. A device according to claim 1 wherein the inner part is disposed co-axially within the outer part with said at least one torque transmitting element extending therebetween.

4. A device according to claim 1 wherein the communicating means is powered by a battery means carried on the device.

5. A device according to claim 1 wherein the torque indicating device is provided with a control means whereby at least one of measurement of torque and communication of said output signal is performed intermittently.

6. A device according to claim 1 wherein the torque sensing means comprises strain gauge means.

7. A device according to claim 1 wherein the aerial comprises a conductor which extends in a circumferential direction around the device to radiate the output signal circumferentially around the device.

8. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial, and said transmitter includes a radio frequency oscillator which transmits an output signal to a receiving means;

said device is rotatable about an axis and the first part comprises a radially inner part, relative to said axis, and the second part comprises a radially outer part, relative to said axis, and the torque transmitting means comprises at least one radially and circumferentially estending torque transmitting element extending between said parts to transmit torque therebetween; and said torque transmitting element has a thickness in the axial direction which is less than its width in the circumferential direction.

9. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means and communicating an output signal dependent on said torque to receiving means which provides an output responsive to said transmitted torque;

said communicating means including an aerial and wherein the electro-magnetic radiation is of radio frequency transmitted from said aerial and said transmitter includes a radio frequency oscillator which transmits an output signal to a receiving means;

said device is rotatable about an axis and the first part comprises a radially inner art relative to said axis, and the second part comprises a radially outer part, relative to said axis and the torque transmitting means comprises at least one radially and circumferentially estending torque transmitting element extending between said parts to transmit torque therebetween; and said torque transmitting element has a thickness in the circumferential direction of the device which is less than its width in the axial direction of the device which is less than its width in the axial direction thereof.

10. A device according to claim 9 wherein the first and second parts are solely interconnected by said torque transmitting element.

11. A torque indicating device comprising first and second parts connected in torque transmitting relationship, torque transmitting means connecting said first and second parts, torque sensing means, provided on said torque transmitting means and responsive to torque transmitted by said torque transmitting means to produce a signal dependent on said transmitted torque, communicating means including a transmitter of electro-magnetic radiation receiving said signal produced by said torque sensing means and communicating an output signal dependent on said torque to receiving means which provides an output responsive to said transmitted torque;

said communicating means including an aerial and wherein the electro-magnetic radiation is of radio frequency transmitted from said aerial and said transmitter includes a radio frequency oscillator which transmits an output signal to a receiving means; and said device being rotatable about an axis, said torque transmitting means comprises at least one torque transmitting element extending between said first and second parts to transmit torque therebetween, bearing means, and during transmission of torque between said parts, one of said parts being non-rotatably mounted on a drive member and the other of said parts being rotatably mounted on said drive member by said bearing means.

12. A device according to claim 11 wherein one of said parts comprises a hub on which the other of said parts is rotatably mounted with the hub having an axially extending portion disposed radially within an axially extending portion of the other part, and at least one torque transmitting element extending between said portion.

13. A device according to claim 11 wherein the or each torque transmitting element has a width in the axial direction of the device which is greater than its thickness in the circumferential direction thereof.

14. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial, and said transmitter includes a radio frequency oscillator which transmits an output signal to a receiving means;

said device is rotatable about an axis and the first part comprises a radially inner part, relative to said axis, and the second part comprises a radially outer part, relative to said axis, and the torque transmitting means comprises at least one radially and circumferentially estending torque transmitting element extending between said parts to transmit torque therebetween; and the or each torque transmitting element is connected to the inner and outer parts in a mode selected from the group comprising "encastré, "simply supported", and "simply supported" for a first extent of relative angular displacement between the inner and outer parts and "encastré" for a further extent of said displacement.

15. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial, and said transmitter includes a radio frequency oscillator which transmits an output signal to a receiving means;

the torque indicating device is provided with a control means whereby at least one of measurement of torque and communication of said output signal is performed intermittently; and wherein, when the torque is below a predetermined level the frequency of measurement of at least one of said torque and communication of said output signal is at a first frequency, whilst when the torque is at or above said predetermined level said frequency is at a second frequency.

16. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial, and said transmitter includes a radio frequency oscillator which transmits an output signal to a receiving means;

the torque sensing means comprises strain gauge means; and wherein the strain gauge means comprises a strain gauge bridge, the output of the bridge is supplied to an amplifier, the amplifier provides an output signal which is fed to a single to bi-polar converter so as to give a signal dependent upon the direction of the torque being transmitted, the output of the single to bi-polar converter is fed to a microprocessor.

17. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial, and said transmitter includes a radio frequency oscillator which transmits an output signal to a receiving means; and wherein the device is provided with at least one target for sensing to indicate the speed of rotation of the device and means to multiply the torque by the speed to provide an indication of power transmitted by the device.

18. A torque indicating device comprising first and second parts connected in torque transmitting relationship, torque transmitting means connecting said first and second parts, torque sensing means, provided on said torque transmitting means and responsive to torque transmitted by said torque transmitting means, to produce a signal dependent on said transmitted torque, communicating means including a transmitter of electro-magnetic radiation receiving said signal produced by said torque sensing means, and communicating an output signal dependent on said torque to receiving means which provides an output responsive to said transmitted torque;

said communicating means including an aerial and wherein the electro-magnetic radiation is of radio frequency transmitted from said aerial and said transmitter includes a radio frequency oscillator which transmits an output signal to a receiving means;

a microprocessor control means whereby at least one of measurement of torque and communication of said output signal is performed intermittently and wherein said radio frequency oscillator is directly transformer coupled to said aerial; and battery means mounted on said device for powering said communicating means and said microprocessor control means.

19. A torque indicating device according to claim 18 wherein the aerial comprises a conductor which extends in a circumferential direction around the device to radiate the output signal circumferentially around the device.

* * * * *

UNITED STATES PATENT AND TRADEMARK OFFICE
CERTIFICATE OF CORRECTION

PATENT NO. : 5,672,834
DATED : September 30, 1997
INVENTOR(S) : Bryan Norman Searle, et al.

It is certified that error appears in the above-identified patent and that said Letters Patent is hereby corrected as shown below:

On the title page: Item [54] and Column 1, line 1,

TORQUE INDICATING DEVICE

Col. 2, line 42, bi-polar

Col. 11, Claim 9, line 11, sensing means,

Col. 11, claim 9, line 17, said aerial,

Col. 11, claim 9, line 21, part,

Col. 12, claim 11, line 7, torque transmitting means,

Col. 12, claim 11, line 11, sensing means,

Col. 12, claim 11, line 17, said aerial,

Col. 14, claim 18, line 17, from said aerial,

Signed and Sealed this

Twenty-third Day of June, 1998

Attest:

BRUCE LEHMAN

*Attesting Officer*     *Commissioner of Patents and Trademarks*